US007806138B1

(12) United States Patent
Frantz

(10) Patent No.: US 7,806,138 B1
(45) Date of Patent: Oct. 5, 2010

(54) VALVE MANIFOLD DEVICE FOR USE WITH SMALL PROPANE CANISTERS

(75) Inventor: Charles G. Frantz, Weatherford, OK (US)

(73) Assignee: Party King Grills Company, LLC, Weatherford, OK (US)

(*) Notice: Subject to any disclaimer, the term of this patent is extended or adjusted under 35 U.S.C. 154(b) by 310 days.

(21) Appl. No.: 11/944,166

(22) Filed: Nov. 21, 2007

(51) Int. Cl.
*G05D 7/00* (2006.01)

(52) U.S. Cl. ....................... 137/606; 137/263; 137/882; 222/6; 222/549

(58) Field of Classification Search ................... 37/255, 37/263, 266, 602, 605, 882; 222/2, 6, 64, 222/66, 68, 518, 549; 137/255, 263, 266, 137/602, 605, 882, 606
See application file for complete search history.

(56) References Cited

U.S. PATENT DOCUMENTS 2,047,339 A * 7/1936 Rosswell ....................... 222/3
2,172,863 A * 9/1939 Buttner .......................... 222/6
2,246,458 A * 6/1941 Macsporran ................... 222/3
2,316,373 A * 4/1943 Rosswell ....................... 222/6
2,641,273 A * 6/1953 Siebens ...................... 137/113
4,862,911 A * 9/1989 Yie ......................... 137/454.4
6,206,032 B1 * 3/2001 Hill ......................... 137/539.5
7,275,663 B2 * 10/2007 Campbell et al. ........... 222/389
2002/0113083 A1 * 8/2002 Gauthier ...................... 222/64
2007/0215209 A1 * 9/2007 Street et al. ................. 137/263

* cited by examiner

*Primary Examiner*—Kevin L Lee
(74) *Attorney, Agent, or Firm*—Head, Johnson & Kachigian, P.C.

(57) ABSTRACT

A valve manifold device for coupling a gas operated appliance in fluid communication to gas cylinders, comprising a manifold having at least two inlet ports and an outlet port, at least two inlet valves respectively attached in fluid communication to the inlet ports of the manifold while being releasably attachable in fluid communication to an outlet assembly on the one pound gas cylinders, and an outlet coupling attached in fluid communication to the outlet port of the manifold and releasably attachable, directly or indirectly, in fluid communication to the gas operated appliance. The inlet valves may be check valves having an interior opening that serves as a gas conduit through the valve and into the manifold. The outlet coupling may have an annular outlet collar compatible with a standard POL, Type 1 or 1-20 connector and may include a check valve.

17 Claims, 3 Drawing Sheets

VALVE MANIFOLD DEVICE FOR USE WITH SMALL PROPANE CANISTERS

BACKGROUND OF THE INVENTION

1. Field of the Invention

This invention relates to a valve manifold device for coupling a gas operated appliance, such as a barbeque grill, in fluid communication to a plurality of one pound propane or LPG cylinders, to increase the volume, capacity and/or fuel pressure available to the gas operated appliance.

2. Prior Art

Gas operated appliances such as lanterns, stoves, catalytic heaters, barbeque grills and the like which are intended to be used outdoors and powered by a fuel such as propane, butane or LPG are well known. Gas cylinders for these appliances may be either conventional one pound propane cylinders or larger, refillable bulk cylinders. The one pound propane cylinders are generally provided with a male outlet assembly, which is connected to a flow conduit, such as a pressure regulator, a hose and an appliance fitting, of the gas operated appliance. The larger refillable cylinders are generally provided with an outlet assembly different from the male outlet assembly of the one pound cylinder. Generally, the appliance fitting of the gas operated appliance is adapted to connect to the outlet assembly of either the one pound cylinder or the refillable cylinder and generally cannot be connected to the other type of cylinder.

One type of appliance fitting for connecting a gas operated appliance to a refillable cylinder is a POL coupling. A POL coupling has an elongated tubular body with a rounded end that fits inside the outlet assembly of a gas cylinder. The elongated body is attached to the outlet assembly by a left handed pipe thread connection between the outer surface of the elongated body and the inner periphery of the outlet assembly. A wrench is generally required to securely attach the POL coupling to the gas cylinder. The elongated body is threaded into the outlet assembly until the rounded end engages a valve seat in the outlet assembly, allowing gas to flow from the outlet assembly through an opening in the elongated body. Typically, the end opposite the rounded end of the elongated body may be threaded externally so as to mate with a standardized nut or threaded opening on a hose or pressure regulator leading, directly or indirectly, to the gas operated appliance.

Another type of appliance fitting for connecting a gas operated appliance to a refillable cylinder is a Type 1 (also known as QCC-1) coupling. A Type 1 coupling has an annular outlet collar that connects to the outlet assembly of the gas cylinder using an external right hand acme thread on the outlet assembly. The appliance fitting couples the gas cylinder to a pressure regulator or hose leading to the gas operated appliance. The Type 1 coupling includes a large, hand-operable nut rotatably mounted on an elongated body of the type used in a POL coupling. The internal acme thread on the nut engages the external acme thread on the outlet assembly of the has cylinder causing the elongated body to slide into the outlet assembly, where a round end (similar to POL type round end) engages and opens the valve in the gas cylinder.

Yet another type of appliance fitting is a 1-20 threaded connector. The 1-20 threaded connector is typically used to with one pound gas cylinders. The outlet assembly of one pound gas cylinders has an annular outlet collar and is fitted with a check valve. The outlet collar includes external right hand threads that are connectable to a 1-20 threaded connector. The 1-20 female threaded connector generally includes an elongated section that slides within the 1-20 male threaded connector of the gas cylinder to mate with a valve member to open the valve in the gas cylinder.

Outdoor gas appliances, especially portable propane grills, are increasingly being utilized in tailgating, camping, fishing, hunting and RV applications. Gas grills are generally fueled by the larger refillable gas cylinders, which are typically 20-pound gas cylinders. These 20-pound gas cylinders are generally difficult to travel with because of their weight, size and configuration. Unlike the 20-pound gas cylinders, the one-pound gas cylinders are lightweight and easily transportable. In addition, if the gas operated appliance is typically used with refillable gas cylinders utilizing a POL or Type 1 outlet assembly, an adaptor must be provided to allow the gas operated appliance to use one-pound gas cylinders having a male 1-20 outlet assembly. However, when the gas operated appliance is adapted to use a one-pound gas cylinder, the gas cylinder may not contain sufficient fuel capacity to operate the gas operated appliance for any extended period of time. Further, additional fuel volume may be desired or required to fully operate the gas operated appliance. A user may desire additional fuel capacity and/or volume to operate the gas operated appliance with one-pound gas cylinders. Thus, there exists a need for a valve manifold device that couples a plurality of one-pound gas cylinders to a gas operated appliance.

It is therefore desirable to provide a novel valve manifold device that couples at least two, one pound portable gas cylinders together.

It is further desirable to provide an improved valve manifold device that increases the overall volume of propane flowing through a multiple-burner gas grill system utilizing one pound gas cylinders.

It is further desirable to provide a valve manifold device that increases the fuel capacity available to a gas appliance.

It is yet further desirable to provide a valve manifold device that increases the volume and fuel pressure available in order to ensure the gas operated appliance performs as if it were connected to a larger, refillable gas cylinder.

It is further desirable to provide a valve manifold device utilizing anti-backflow, check valves to ensure consumer safety in the event a gas cylinder is accidentally removed or if the fuel is forgot to be shut-off from another cylinder.

It is further desirable to provide a valve manifold device that prohibits a backflow condition from occurring and thereby minimizes the chance of an unwanted or unintended fire, burn or freeze burn.

SUMMARY OF THE INVENTION

In general, in it first aspect, the invention relates to a valve manifold device for coupling a gas operated appliance in fluid communication to gas cylinders, preferably standard one pound LPG cylinders. The valve manifold device comprises a manifold having at least two inlet ports and an outlet port; at least two inlet check valves respectively attached in fluid communication to the inlet ports of the manifold, each of the inlet check valves having an annular, threaded outlet collar releasably attachable in fluid communication to an outlet assembly on a pressurized gas cylinder; and an outlet coupling attached in fluid communication to the outlet port of the manifold. The outlet coupling has an annular, threaded outlet collar releasably attachable, directly or indirectly, in fluid communication to a gas operated appliance.

Each of the inlet check valves may include an interior opening through the inlet check valve and the outlet collar. The interior opening extends from an inlet in a protruding, cylindrical outer section to an outlet in an inner section of the inlet check valve. The outer section of the inlet check valve may extend coaxially from the outlet collar and is capable of protruding into the outlet assembly on the gas cylinder. This interior opening serves as a gas conduit through the inlet check valve. An enlarged center portion in the interior opening may be positioned between the inner and outer sections of the inlet check valve. A valve seat is formed at an outer end of the center portion of the interior opening, and a valve member, which may be a movable ball, may also be in the center portion of the interior opening. The valve member may be shaped to fit against the valve seat in a flow restricting relationship therewith. A valve stem may be engaged with a biasing mechanism, preferably a compression coil spring, allowing selective movement of the valve member outwardly toward a closed position against the valve seat or inwardly toward an open position away from the valve seat.

The outlet coupling may include a check valve mounted therein, having a movable valve member that is biased outwardly by a compression coil spring toward a normally closed position against a valve seat. The valve member can be resiliently movable inwardly by pressure thereon to permit the release of gas from the manifold. Thread on the outlet collar of the outlet coupling may be an external right hand acme thread compatible with a standard Type-1 gas cylinder connector, an internal left hand pipe thread compatible with a standard POL gas cylinder connector or a thread compatible to a standard 1-20 male gas cylinder connector.

Other advantages and features will be apparent from the following description, and from the claims.

DETAILED DESCRIPTION OF THE PREFERRED EMBODIMENTS

The devices discussed herein are merely illustrative of specific manners in which to make and use the invention and are not to be interpreted as limiting in scope.

While the devices have been described with a certain degree of particularity, it is to be noted that many modifications may be made in the details of the construction and the arrangement of the devices and components without departing from the spirit and scope of this disclosure. It is understood that the devices are not limited to the embodiments set forth herein for purposes of exemplification.

As used herein, the expression “inner” usually refers to a direction toward the manifold, while the term “outer” usually refers to a direction facing away from the manifold and toward the gas appliance or gas cylinder.

Figure 1:
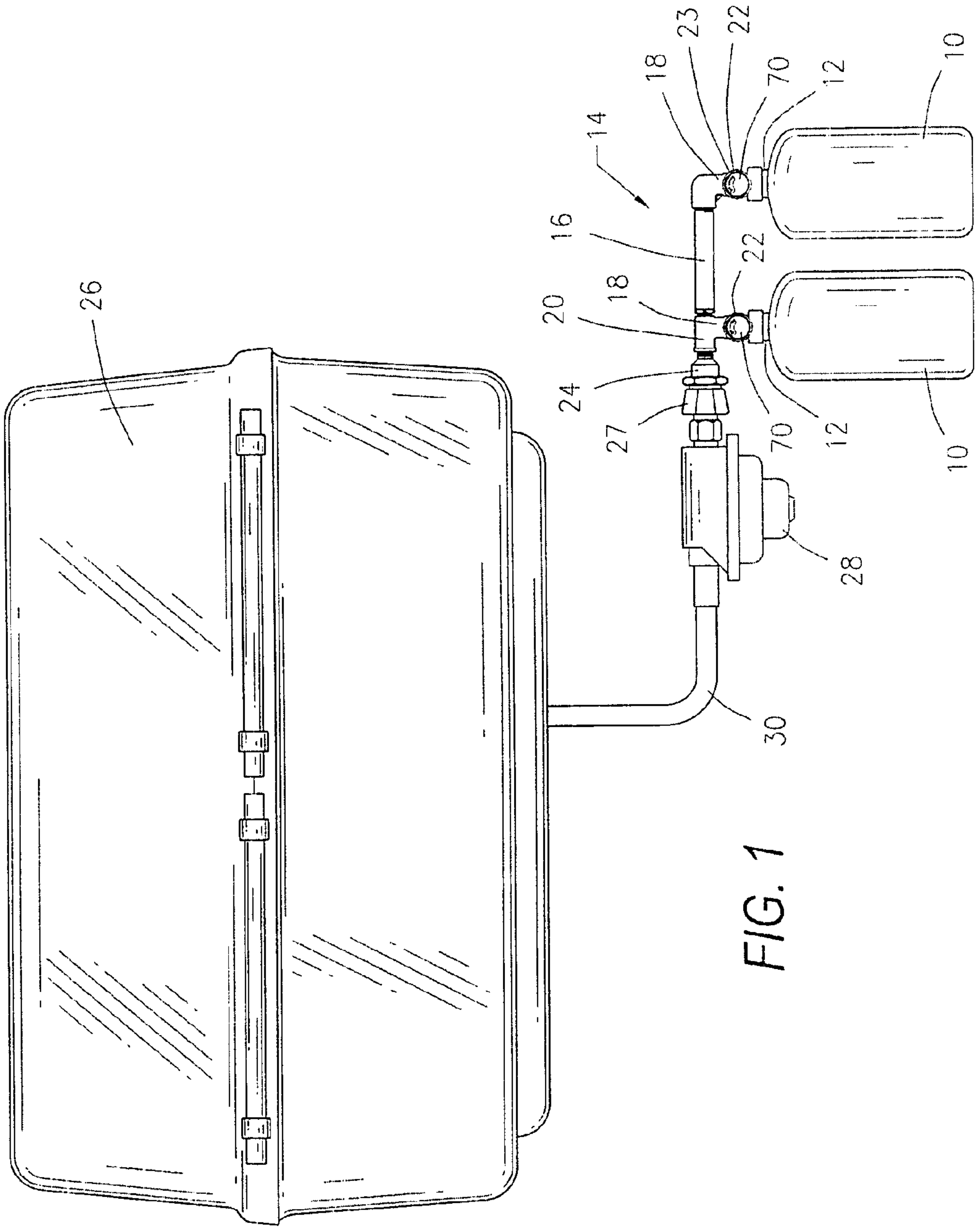
FIG. 1 is a perspective view of the use of the valve manifold device disclosed herein in coupling a gas operated appliance, such as a gas grill, to the outlet assembly of one pound gas cylinders.
Figure 2:
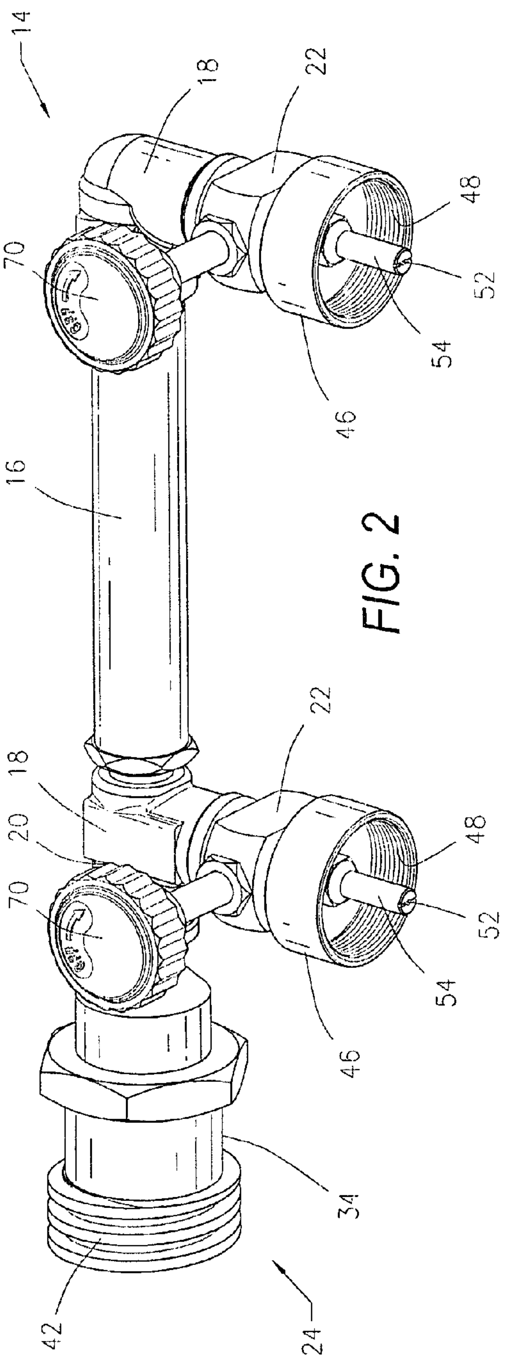
FIG. 2 is a perspective view of an embodiment of the valve manifold device disclosed herein.
Figure 3:
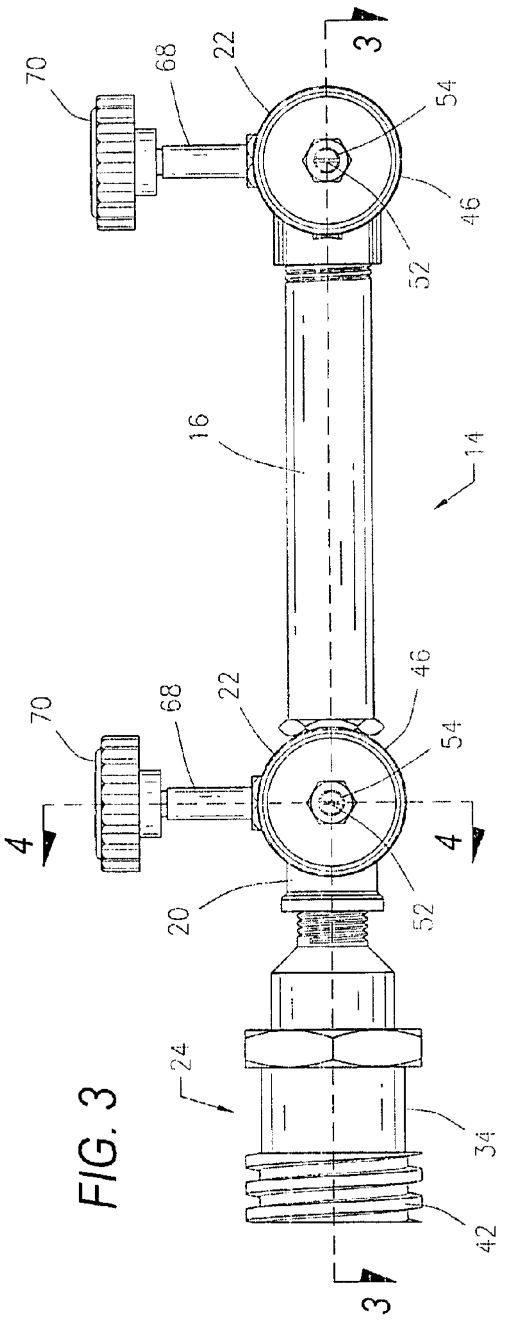
FIG. 3 is a side view of the valve manifold device shown in FIG. 1.
Figure 4:
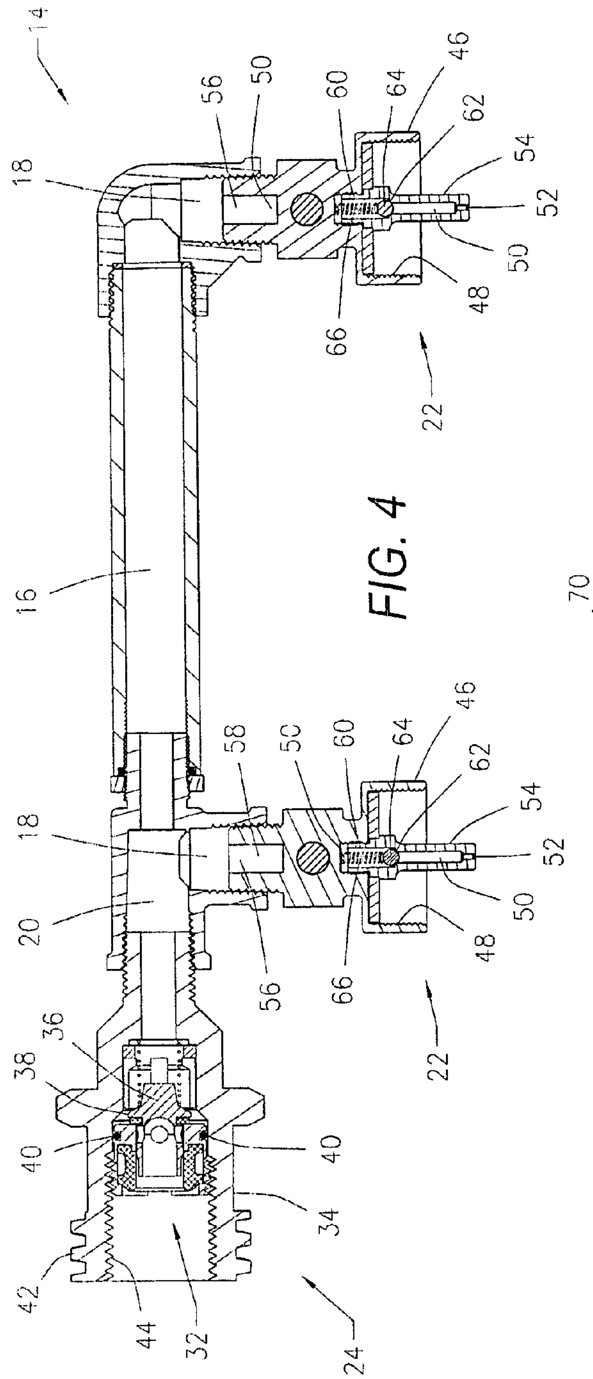
FIG. 4 is a cross-sectional view along line 3-3 of the valve manifold device shown in FIG. 1.
Figure 5:
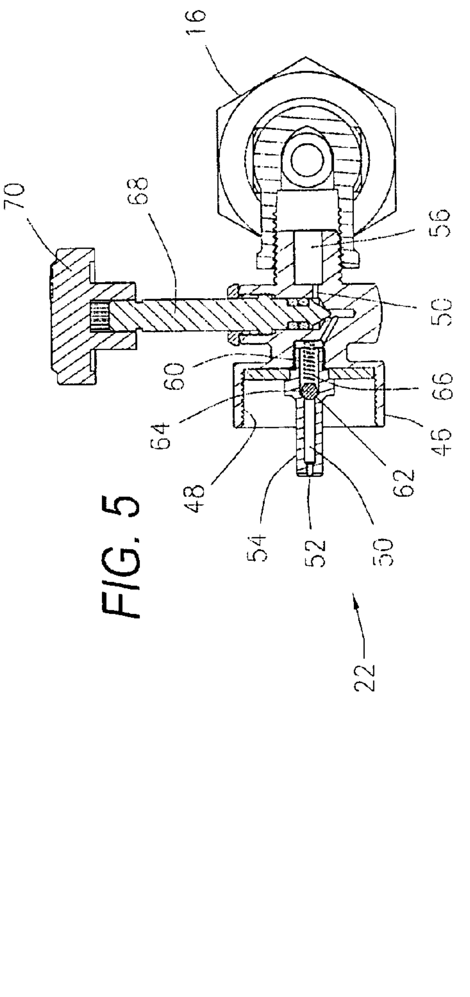
FIG. 5 is a cross sectional view along line 4-4 of the valve manifold device shown in FIG. 1.

Referring to the figures of the drawings, wherein like numerals of reference designate like elements throughout the several views, propane or LPG cylinders 10, typically having a capacity of one pound, are fitted with an outlet assembly 12 of standardized 1-20 male configuration. The outlet assembly 12 provides a gas passageway to a valve manifold device 14. In accordance with the present invention, the valve manifold device 14 comprises a manifold 16 with at least two inlet ports 18 and an outlet port 20. Inlet valves 22 are respectively attached in fluid communication with inlet ports 18. Inlet valves 22 are also respectively releasably attached to the outlet assembly 12 of the gas cylinders 10. Inlet valves 22 may be operated by hand wheel 70. An outlet coupling 24 is attached to the outlet port 20 of the manifold 16. The outlet coupling 24 is also releasably attachable, directly or indirectly, to a gas operated appliance 26. The outlet coupling 24 of the valve manifold device 14 is attachable to the outlet assembly 12 in order to couple or connect gas cylinders 10 to a suitable gas operated appliance 26, such as a propane or LP gas grill as illustrated in FIG. 1. An appliance fitting 27 provided with a Type 1 (QCC-1), POL or 1-20 female connection is typically first connected to a pressure regulator 28, and the pressure regulator 28 is connected by a hose 30 to the gas operated appliance 26. The gas operated appliance 26, shown as a gas grill, may also have its own manually adjustable valve(s) for controlling the rate of flow of gas to the grill burners.

The outlet coupling 24 is attached to the outlet port 20 of manifold 16 of valve manifold device 14. The outlet coupling 24 may include an automatic shutoff valve or other conventional type of check valve 32 mounted within an annular collar 34 that defines the outlet of the outlet coupling 24. The check valve 32 may include a movable valve member 36 that is biased outwardly toward a closed position against valve seat 38 by a compression coil spring 40 or other biasing mechanism. The valve member 36 may be resiliently movable inwardly in order to open the check valve 32. This may occur automatically whenever the appliance fitting 27 from the gas operated appliance 26 is properly attached to the outlet coupling 24 of valve manifold device 14. This prevents the release of gas from the gas cylinders 10 by the valve manifold device 14 unless the gas operated appliance 26 is properly connected to the outlet coupling 24. The outlet collar 34 may be provided with an external right hand acme thread 42 in a Type 1 (QCC-1) connection. The outlet collar 34 may also be internally threaded with a left hand pipe thread 44, so that the collar can accommodate an older style POL fitting, which may be threaded into the outlet coupling 24. The outlet collar 34 may also have external threads compatible to a 1-20 threaded connector.

The inlet valves 22 includes an annular collar or connector 46 having internal threads 48 that mate with the external threads (not shown) on the outlet assembly 12 of gas cylinders 10. The inlet valves 22 may be check valves, each having an interior opening 50 therethrough. The interior opening 50 extends from an inlet 52 in a protruding cylindrical outer section 54 to an outlet 56 in an inner section 58 of the check valve 22. The outer section 54 extends coaxially from the collar 46 and is capable of protruding into the outlet assembly 12 of gas cylinders 10. The interior opening 50 serves as a gas passageway or conduit through the check valve 22. The interior opening 50 may also include an enlarged center portion 60 between the inner section 58 and the outer section 54 of the check valve 22. A valve seat 62 is formed at an outer end of the center portion 60 of the interior opening 50. The valve seat 62 is designed to mate with a movable valve member 64 in the center portion 60. The valve member 64 may be in the form of a spherical ball, and the valve seat 62 may be shaped to fit against the ball 64 in a flow restricting relationship therewith. A resilient biasing device or spring 66 also fits within the interior opening 50 of the inner section 58 of check valve 22. The biasing force could be provided by other means. The interior opening 50 in the protruding outer section 54 may be narrower than the interior opening 50 in the inner section 58 of check valve 22. As shown, spring 66, which may be a compression spring, engages the outer side of the valve member 64 and urges the valve member 64 toward a seated position against the valve seat 62. A valve stem 68 may engage the compression coil spring 66 allowing selective movement of the valve member 64 outwardly toward a closed position against the valve seat 62 or inwardly toward an open position away from the valve seat 62, thus permitting gas flow through the interior opening 50 of the inlet valve 22. The valve stern 68 may be provided with a hand wheel 70 or other mechanism.

When the outlet assembly 12 of gas cylinder 10 is connected to the inlet valves 22, gas flows through the interior opening 50 of inlet valves 22 into the manifold 16. The flowing gas exerts pressure against the valve member 36 of the outlet coupling 24 urging the valve member 36 toward a closed position. When the appliance fitting 27 of gas operated appliance 26 is connected to the outlet coupling 24, the appliance fitting 27 extends inwardly a sufficient distance to open the outlet coupling 24 check valve.

The foregoing construction provides a cost effective and simplified manifold valve assembly for coupling a plurality of one-pound gas cylinders in fluid communication to increase the volume, capacity and/or fuel pressure available to the gas operated appliance. When used with check valves for the inlet valves, the manifold valve device of the present invention provides for an anti-backflow into each of the inlet valves connected to the gas cylinders. This protective feature helps ensure the safety of users if one gas cylinder is accidentally removed and the inlet valve on the other gas cylinder is mistakenly left on. The use of inlet check valves prohibits a backflow condition from occurring, and thereby minimizes the chance of an unwanted fire, burn or freeze burn.

The valve manifold device disclosed herein may be constructed of brass, aluminum or other nonreactive, resilient material. In addition, the outlet collar of the outlet coupling may include 1-20 male threads to connect to a gas operated appliance utilizing a 1-20 female connector. The outlet coupling may be equipped with a check valve therein when used with the 1-20 connection.

Whereas, the devices and methods have been described in relation to the drawings and claims, it should be understood that other and further modifications, apart from those shown or suggested herein, may be made within the spirit and scope of this invention.

What is claimed is:

1. A valve manifold device for coupling a gas operated appliance in fluid communication to gas cylinders, comprising:

a manifold having at least two inlet ports and an outlet port;

at least two inlet valves respectively attached in fluid communication to said inlet ports of said manifold, wherein each of said inlet valves are releasably and directly attachable in fluid communication to an outlet assembly with external threads on a gas cylinder, wherein said inlet valves comprise check valves and wherein each of said check valves comprises:

an inner section of said check valve, said inner section located adjacent said outlet port;

an annular, threaded collar having internal threads that mate with said external threads of said outlet assembly;

a protruding cylindrical outer section, said outer section of said check valve extending coaxially from said collar, protruding through and beyond said collar, and capable of protruding into said outlet assembly on said gas cylinder, wherein said collar has an internal diameter and wherein said protruding cylindrical outer section has an external diameter sufficiently smaller than said internal diameter of said collar that said collar and said protruding cylindrical outer section do not touch; and an interior opening therethrough that extends from an inlet in said protruding cylindrical outer section to an outlet in said inner section of said check valve, said interior opening serving as a gas conduit through said check valve, wherein said interior opening further comprises an enlarged center portion between said inner and outer sections of said check valve, said center portion having a valve seat at an outer end thereof wherein said outer end of said center portion is adjacent said outer section; and an outlet coupling attached in fluid communication to said outlet port of said manifold and releasably attachable, directly or indirectly, in fluid communication to a gas operated appliance.

2. The valve manifold device of claim 1 further comprising a movable valve member being positioned in said center portion of said interior opening.

3. The valve manifold device of claim 2 wherein said valve member is a spherical ball and said valve seat is shaped to fit against said ball in a flow restricting relationship therewith.

4. The valve manifold device of claim 2 further comprising a valve stem engaging a compression coil spring allowing selective movement of said valve member outwardly toward a closed position against said valve seat or inwardly toward an open position away from said valve seat.

5. The valve manifold device of claim 1 wherein said outlet coupling comprises an annular, threaded outlet collar having a check valve mounted therein.

6. The valve manifold device of claim 5 wherein said check valve further comprises a movable valve member that is biased outwardly toward a normally closed position against a valve seat and is resiliently movable inwardly by pressure thereon to permit the release of gas from said manifold.

7. The valve manifold device of claim 6 wherein a compression coil spring biases said valve member.

8. The valve manifold device of claim 5 wherein said outlet collar of said outlet coupling is provided with an external right hand acme thread compatible with a standard Type-1 gas cylinder connector.

9. The valve manifold device of claim 5 wherein said outlet collar of said outlet coupling is provided with an internal left hand pipe thread compatible with a standard POL gas cylinder connector.

10. The valve manifold device of claim 5 wherein outlet collar of said outlet coupling is provided with a thread compatible to a standard 1-20 male gas cylinder connector.

11. The valve manifold device of claim 1 wherein said outlet coupling includes an annular, threaded outlet collar.

12. The valve manifold device of claim 11 wherein said outlet collar of said outlet coupling is provided with a thread compatible to a standard 1-20 male gas cylinder connector.

13. The valve manifold device of claim 1 wherein said gas cylinder is a standard one pound gas cylinder.

14. A valve manifold device for coupling a gas operated appliance in fluid communication to gas cylinders, comprising:

a manifold having at least two inlet ports and an outlet port;

at least two inlet check valves respectively attached in fluid communication to said inlet ports of said manifold, each of said inlet check valves having an annular, threaded collar releasably and directly attachable in fluid communication to an outlet assembly with external threads on a pressurized gas cylinder, wherein said threaded collar has internal threads that mate with said external threads of said outlet assembly, and each of said inlet check valves further comprising:

an inner section of said check valve, said inner section located adjacent said outlet port;

a protruding cylindrical outer section, said outer section of said check valve extending coaxially from said collar, protruding through and beyond said collar, and capable of protruding into said outlet assembly on said gas cylinder, wherein said collar has an internal diameter and wherein said protruding cylindrical outer section has an external diameter sufficiently smaller than said internal diameter of said collar that said collar and said protruding cylindrical outer section do not touch; and an interior opening through said inlet check valve and said collar, said interior opening extending from an inlet in said protruding, cylindrical outer section to an outlet in said inner section of said inlet check valve, wherein said interior opening serves as a gas conduit through said inlet check valve;

an enlarged center portion in said interior opening being positioned between said inner and outer sections of said inlet check valve;

a valve seat at an outer end of said center portion of said interior opening wherein said outer end of said center portion is adjacent said outer section;

a movable ball in said center portion of said interior opening, said ball shaped to fit against said valve seat in a flow restricting relationship therewith; and a valve stem engaging a compression coil spring allowing selective movement of said ball outwardly toward a closed position against said valve seat or inwardly toward an open position away from said valve seat; and an outlet coupling attached in fluid communication to said outlet port of said manifold, said outlet coupling having an annular, threaded outlet collar releasably attachable, directly or indirectly, in fluid communication to a gas operated appliance.

15. The valve manifold device of claim 14 wherein said outlet coupling includes a check valve mounted therein, said check valve further having a movable valve member that is biased outwardly by a compression coil spring toward a normally closed position against a valve seat, said valve member being resiliently movable inwardly by pressure thereon to permit the release of gas from said manifold.

16. The valve manifold device of claim 14 wherein said thread on said outlet collar of said outlet coupling is selected from the group consisting of an external right hand acme thread compatible with a standard Type-1 gas cylinder connector, an internal left hand pipe thread compatible with a standard POL gas cylinder connector or a thread compatible to a standard 1-20 male gas cylinder connector.

17. The valve manifold device of claim 14 wherein said gas cylinder is a standard one pound gas cylinder.

* * * * *